United States Patent [19]

Nguyen et al.

[11] Patent Number: 5,791,415
[45] Date of Patent: Aug. 11, 1998

[54] STIMULATING WELLS IN UNCONSOLIDATED FORMATIONS

[75] Inventors: Philip D. Nguyen; John L. Brumley; Lewis R. Norman, all of Duncan, Okla.

[73] Assignee: Halliburton Energy Services, Inc., Houston, Tex.

[21] Appl. No.: 816,665

[22] Filed: Mar. 13, 1997

[51] Int. Cl.$^6$ .................. E21B 33/138; E21B 43/267
[52] U.S. Cl. .............................. 166/280; 166/280
[58] Field of Search .................. 166/280, 281, 166/295, 297, 300

[56] References Cited

U.S. PATENT DOCUMENTS

| | | | |
|---|---|---|---|
| 2,556,169 | 6/1951 | Crouch et al. | 166/295 |
| 3,022,825 | 2/1962 | Winsauer et al. | 166/295 |
| 3,070,160 | 12/1962 | Reistle, Jr. | 166/281 |
| 3,525,398 | 8/1970 | Fisher | 166/288 |
| 3,608,639 | 9/1971 | Hart | 166/308 |
| 3,800,847 | 4/1974 | Rike | 166/295 |
| 3,815,680 | 6/1974 | McGuire et al. | 166/281 |
| 3,854,533 | 12/1974 | Gurley et al. | 166/281 X |
| 4,010,802 | 3/1977 | Miles et al. | 166/281 |
| 4,042,032 | 8/1977 | Anderson et al. | 166/276 |
| 4,070,865 | 1/1978 | McLaughlin | |
| 4,074,760 | 2/1978 | Copeland et al. | 166/276 |
| 4,336,842 | 6/1982 | Graham et al. | 166/276 |
| 4,649,998 | 3/1987 | Friedman | 166/294 |
| 4,829,100 | 5/1989 | Murphey et al. | 523/131 |
| 4,917,188 | 4/1990 | Fitzpatrick, Jr. | 166/295 |
| 5,058,676 | 10/1991 | Fitzpatrick et al. | 166/278 |
| 5,105,886 | 4/1992 | Strubhar et al. | 166/280 |
| 5,507,344 | 4/1996 | Young et al. | 166/281 |
| 5,547,023 | 8/1996 | McDaniel et al. | 166/280 |

*Primary Examiner*—George A. Suchfield
*Attorney, Agent, or Firm*—Robert A. Kent

[57] ABSTRACT

The present invention provides methods of stimulating fluid production from an unconsolidated formation penetrated by a wellbore while preventing the migration of formation sands with fluids produced from the formation. The methods basically comprise the steps of injecting a hardenable resin composition into a portion of the formation surrounding the wellbore whereby that portion is consolidated into a hard permeable mass, forming an indentation in the wellbore to facilitate the initiation of a fracture in the consolidated portion of the formation, creating a fracture in the formation extending from the wellbore through the consolidated portion of the formation into an unconsolidated portion thereof and depositing hardenable resin composition coated proppant in the fracture whereby the proppant is consolidated into a hard permeable mass.

22 Claims, No Drawings

5,791,415

1
STIMULATING WELLS IN UNCONSOLIDATED FORMATIONS

BACKGROUND OF THE INVENTION

1. Field of the Invention.

The present invention relates generally to improved methods of stimulating wells in unconsolidated formations, and more particularly, to methods of stimulating fluid production from such wells while preventing the migration of sand with the fluids produced therefrom.

2. Description of the Prior Art.

Oil and gas wells are often completed in unconsolidated formations containing loose and incompetent sands which migrate with oil, gas and/or water produced by the wells. The presence of sand in the produced fluids is disadvantageous and undesirable in that the sand particles abrade pumping and other producing equipment and reduce the fluid production capabilities of the producing zones in the wells.

Incompetent subterranean formations include those which contain loose sands that are readily entrained by produced fluids and those wherein the sand particles making up the formations are bonded together with insufficient bond strength to withstand the forces produced by the production of fluids from the formations. A technique which is often used for minimizing sand production from such formations has been to produce fluids from the formations at low flow rates whereby the near well stabilities of sand bridges and the like in the formations are preserved. However, the collapse of such sand bridges often occurs as a result of unintentional high production rates and pressure surging.

Heretofore, unconsolidated formations have been treated by creating fractures in the formations and depositing proppant in the fractures to maintain them in open positions. In addition, the proppant has heretofore been consolidated within the fractures into hard permeable masses by hardenable resin compositions to reduce the migration of sand through the fractures with produced fluids. Very often, to insure that sand is not produced, costly gravel packs, sand screens and the like have also been installed in the wells. Since gravel packs, sand screens and the like filter out the sand from the fluids being produced, the presence of the filtered sand adds to the flow resistance thereby producing additional pressure drawdown which causes the fracture faces and other portions of the unconsolidated formations to break down and the consolidated proppant in fractures, gravel packs and the like to be bypassed.

In wells formed in shallow, high permeability unconsolidated producing formations, creating fractures which extend significant distances into the formations is difficult to accomplish. The reason for this is that the horizontal stresses around the wellbore in an unconsolidated formation are generally the same, and instead of a single fracture which extends from opposing sides of the wellbore, i.e., a bi-wing fracture, multiple fractures are formed around the wellbore. Such multiple fractures accept fluids and proppant, but they often can not be extended to the optimum length required for a successful stimulation procedure. In addition, the conductivities of the multiple fractures are much lower than the conductivity of a single bi-wing fracture.

Thus, there is a need for improved methods of stimulating wells formed in unconsolidated hydrocarbon producing formations whereby bi-wing fractures can be formed extending to optimum lengths in the formations to thereby increase fluid production from the formations while preventing the migration of formation sand with the produced fluids so that gravel packs, sand screens and the like are not required.

SUMMARY OF THE INVENTION

The present invention provides improved unconsolidated formation stimulation and sand migration prevention methods which meet the needs described above and overcome the deficiencies of the prior art. The methods are particularly suitable for use in, cased or open hole wells completed in unconsolidated formations and are basically comprised of the following steps. A hardenable resin composition is first injected into a portion of the unconsolidated formation surrounding the wellbore and caused to harden whereby that portion of the formation is consolidated into a hard permeable mass. A fracture, preferably a single bi-wing fracture, is next created in the formation extending from the wellbore through the consolidated portion of the formation into an unconsolidated portion of the formation. Thereafter, a hardenable resin composition coated proppant is deposited in the fracture and the resin composition is caused to harden whereby the proppant is consolidated into a hard permeable mass which filters out and prevents the migration of formation sands with fluids produced through the fracture into the wellbore.

In order to facilitate the initiation of a single by-wing fracture extending through the consolidated portion and into unconsolidated portions of the formation, at least one indentation, and preferably a pair of opposed indentations, are formed in the wellbore which extend into the consolidated portion of the formation. The indentations weaken the consolidated portion of the formation whereby a single bi-wing fracture is created therein extending into unconsolidated portions of the formation.

The combination of the consolidated portion of the formation around the wellbore through which the fracture extends and the consolidated proppant in the fracture prevents the migration of sand with produced fluids from the formation.

It is, therefore, a general object of the present invention to provide improved methods of stimulating open hole wells in unconsolidated formations while preventing the migration of formation sands with fluids produced from the formations.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of stimulating oil and/or gas production from an unconsolidated subterranean formation penetrated by a cased or open hole wellbore while preventing the migration of sand with produced fluids from the formation. The methods eliminate the necessity of installing expensive gravel packs, sand screens and the like.

The methods of the invention are basically comprised of the steps of first injecting a hardenable resin composition into a portion of the formation surrounding the wellbore and causing the resin to harden whereby that portion of the formation is consolidated into a hard permeable mass. A fracture is next created in the formation extending from the wellbore through the consolidated portion of the formation into an unconsolidated portion of the formation. A hardenable resin composition coated proppant is deposited in the fracture and caused to harden whereby the proppant is consolidated into a hard permeable mass which filters out and prevents the migration of formation sand with fluids produced through the fracture into the wellbore.

In order to insure that a single bi-wing fracture is formed in the consolidated portion of the formation which can be extended through the consolidated portion into unconsolidated portions of the formation, at least one and preferably two opposing indentations are formed in the wellbore extending into the consolidated portion of the formation prior to fracturing the formation. The term "bi-wing fracture" is used herein to mean a fracture which extends outwardly from a wellbore on opposite sides thereof in a plane which is generally parallel to the axis of the wellbore.

The above mentioned indentations can be holes, slots or the like which extend into the consolidated portion of the formation from the wellbore. The combination of the consolidation of the portion of the incompetent formation through which the fracture is formed and the indentations formed therein cause a single bi-wing fracture to be created instead of multiple, narrow and short fractures which would otherwise result. A variety of techniques can be utilized to form the indentations which are well known to those skilled in the art. Preferred such techniques include forming opposing holes extending from the open hole wellbore into the consolidated portion of the formation utilizing a conventional perforating gun or forming opposing slots in the consolidated formation utilizing a cutting tool such as a fluid jet cutting tool.

The hardenable resin compositions which are useful in accordance with the present invention for consolidating a portion of the formation as well as the proppant deposited in the bi-wing fracture formed are generally comprised of a hardenable organic resin and a resin-to-sand coupling agent.

Such resin compositions are well known to those skilled in the art as are their use for consolidating portions of unconsolidated formations and fracture proppant material into hard permeable masses. A number of such compositions are described in detail in U.S. Pat. No. 4,042,032 issued to Anderson et al. on Aug. 16, 1977, U.S. Pat. No. 4,070,865 issued to McLaughlin on Jan. 31, 1978, U.S. Pat. No. 5,058,676 issued to Fitzpatrick et al. on Oct. 22, 1991 and U.S. Pat. No. 5,128,390 issued to Murphey et al. on Jul. 7, 1992, all of which are incorporated herein by reference. The hardenable organic resin used is preferably a liquid at 80° F. and is cured or hardened by heating or by contact with a hardening agent.

Examples of hardenable organic resins which are particularly suitable for use in accordance with this invention are novolak resins, polyepoxide resins, polyester resins, phenol-aldehyde resins, urea-aldehyde resins, furan resins and urethane resins. These resins are available at various viscosities, depending upon the molecular weight of the resin. The preferred viscosity of the organic resin used in accordance with this invention is in the range of from about 1 to about 1,000 centipoises at 80° F. However, as will be understood, resins of higher viscosities can be utilized when mixed or blended with one or more diluents. Examples of suitable diluents for polyepoxide resins are styrene oxide, octylene oxide, furfuryl alcohol, phenols, furfural, liquid monoepoxides such as allyl glycidyl ether, and liquid diepoxides such as diglycidyl ether or resorcinol. Examples of such diluents for furfuryl alcohol resins, phenol-aldehyde resins and urea-aldehyde resins include, but are not limited to, furfuryl alcohol, furfural, phenol and cresol. Diluents which are generally useful with all of the various resins mentioned above include phenols, formaldehydes, furfuryl alcohol and furfural.

The resin-to-sand coupling agent is utilized in the hardenable resin compositions to promote coupling or adhesion to sand and other silicious materials in the formation to be treated. A particularly suitable such coupling agent is an aminosilane compound or a mixture of aminosilane compounds selected from the group consisting of N-β-(aminoethyl)-γ-aminopropyltrimethoxysilane, N-β-(aminoethyl)-N-β-(aminoethyl)-γ-aminopropyltrimethoxysilane, N-β-(aminopropyl)-N-β-(aminobutyl)-γ-aminopropyltriethoxysilane and N-β-(aminopropyl)-γ-aminopropyltriethoxysilane. The most preferred coupling agent is N-β-(aminoethyl)-γ-aminopropyltrimethoxysilane.

As mentioned, the hardenable resin composition used is caused to harden by heating in the formation or by contact with a hardening agent. When a hardening agent is utilized, it can be included in the resin composition (internal hardening agents) or the resin composition can be contacted with the hardening agent after the resin composition has been placed in the subterranean formation to be consolidated (external hardening agents). An internal hardening agent is selected for use that causes the resin composition to harden after a period of time sufficient for the resin composition to be placed in a subterranean zone or formation. Retarders or accelerators to lengthen or shorten the cure times are also utilized. When an external hardening agent is used, the hardenable resin composition is first placed in a zone or formation to be consolidated followed by an overflush solution containing the external hardening agent.

Suitable internal hardening agents for hardening resin compositions containing polyepoxide resins include, but are not limited to, amines, polyamines, amides and polyamides. A more preferred internal hardening agent for polyepoxide resins is a liquid eutectic mixture of amines and methylene dianiline diluted with methyl alcohol. Examples of internal hardening agents which can be used with resin compositions containing furan resins, phenol-aldehyde resins, ureaaldehyde resins and the like are hexachloroacetone, 1,1,3-trichlorotrifluoro-acetone, benzotrichloride, benzylchloride and benzalchloride.

Examples of external hardening agents for consolidating furan resins, phenol-aldehyde resins and urea-aldehyde resins are acylhalide compounds, benzotrichloride, acetic acid, formic acid and inorganic acids such as hydrochloric acid. Generally, external hardening agents selected from the group consisting of inorganic acids, organic acids and acid producing chemicals are preferred. The hardenable resin compositions can also include surfactants, dispersants and other additives well known to those skilled in the art.

The creation of fractures in a subterranean formation utilizing a hydraulic fracturing process is also well known to those skilled in the art. The hydraulic fracturing process generally involves pumping a viscous fracturing fluid containing suspended particulate proppant into the formation at a rate and pressure whereby fractures are created therein. The continued pumping of the fracturing fluid extends the fractures in the formation and carries proppant into the fractures. Upon the reduction of the flow of the fracturing fluid and the reduction in pressure exerted on the formation, the proppant is deposited in the fractures and the fractures are prevented from closing by the presence of the proppant therein.

Typical fracturing fluids which have been utilized heretofore include gelled water or oil base liquids, foams and emulsions. The foams utilized have generally been comprised of water based liquids containing one or more foaming agents foamed with a gas such as nitrogen. Emulsions formed with two or more immiscible liquids have also been utilized. A particularly useful emulsion for carrying out formation fracturing procedures is comprised of a water based liquid and a liquified, normally gaseous fluid such as carbon dioxide. Upon pressure release, the liquified gaseous fluid vaporizes and rapidly flows out of the formation.

The most common fracturing fluid utilized heretofore has been comprised of an aqueous liquid such as fresh water or salt water combined with a gelling agent for increasing the viscosity of the fluid. The increased viscosity reduces fluid loss and allows the fracturing fluid to transport significant concentrations of proppant into the created fractures.

A variety of gelling agents have been utilized including hydratable polymers which contain one or more of the functional groups such as hydroxyl, cis-hydroxyl, carboxyl, sulfate, sulfonate, amino or amide. Particularly useful such polymers are polysaccharide and derivatives thereof which contain one or more of the monosaccharide units galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratible synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol and polyvinylpyrrolidone.

Preferred hydratible polymers which yield high viscosities upon hydration, i.e., apparent viscosities in the range of from about 10 centipoises to about 90 centipoises at concentrations in the range of from about 10 pounds per 1,000 gallons to about 80 pounds per 1,000 gallons in water, are guar gum and guar derivatives such as hydroxypropylguar and carboxymethylguar, cellulose derivatives such as hydroxyethyl cellulose, carboxymethyl cellulose and carboxymethylhydroxyethyl cellulose, locust bean gum, carrageenan gum and xanthan gum.

The viscosities of aqueous polymer solutions of the types described above can be increased by combining crosslinking agents with the polymer solutions. Examples of crosslinking agents which can be utilized are multivalent metal salts or compounds which are capable of releasing the metal ions in an aqueous solution. Examples of such multivalent metal ions are chromium, zirconium, antimony, titanium, iron (ferrous or ferric), zinc or aluminum.

The above described gelled or gelled and cross-linked fracturing fluids can also include gel breakers such as those of the enzyme type, the oxidizing type or the acid buffer type which are well known to those skilled in the art. The gel breakers cause the viscous fracturing fluid to revert to thin fluids that can be produced back to the surface after they have been used to create fractures and carry proppant in a subterranean formation.

Particulate proppant material is suspended in the viscous fracturing fluid so that it is carried into the created fractures and deposited therein by the fracturing fluid when the flow rate of the fracturing fluid and the pressure exerted on the fractured subterranean formation are reduced. The proppant functions to prevent the fractures from closing due to overburdened pressures, i.e., to prop the fractures open, whereby produced fluids can flow through the fractures. Also, the proppant is of a size such that formation sands migrating with produced fluids are prevented from flowing through the flow channels formed by the fractures, i.e., the proppant filters out the migrating sand. Various kinds of particulate materials can be utilized as proppant in accordance with the present invention including sand, bauxite, ceramic materials, glass materials and "TEFLON™" materials. The particulate material used can have a particle size in the range of from about 2 to about 400 mesh, U.S. Sieve Series. The preferred particulate material is sand having a particle size in the range of from about 10 to about 70 mesh, U.S. Sieve Series. Preferred sand particle size distribution ranges are 1 or more of 10–20 mesh, 20–40 mesh, 40–60 mesh or 50–70 mesh, depending on the particle size and distribution of the formation sand to be screened out by the proppant.

The proppant size and distribution are carefully selected in accordance with the size and distribution of the formation sand and the proppant is coated with a hardenable resin composition of the type described above. The resin coated proppant can be prepared in accordance with conventional batch mixing techniques followed by the suspension of the resin coated proppant in the fracturing fluid utilized. Alternatively, the fracturing fluid containing resin coated proppant can be prepared in a substantially continuous manner such as in accordance with the methods disclosed in U.S. Pat. No. 4,829,100 issued on May 9, 1989 to Murphey et al. or U.S. Pat. No. 5,128,390 issued on Jul. 7, 1992 to Murphey et al., both of which are incorporated herein by reference.

A preferred method of the present invention for stimulating fluid production from an unconsolidated formation penetrated by a wellbore while preventing the migration of formation sands with fluids produced from the formation is comprised of the following steps. A hardenable resin composition is injected into a portion of the formation adjacent to and surrounding the wellbore and the resin composition is caused to harden whereby that portion of the formation is consolidated into a hard permeable mass. A pair of opposing indentations are formed in the wellbore which extend into the consolidated portion of the formation to facilitate the initiation of a by-wing fracture. A bi-wing fracture is next created in the formation extending from the wellbore through the consolidated portion of the formation into unconsolidated portions thereof. A hardenable resin composition coated proppant is deposited in the fracture and the resin composition is caused to harden whereby the proppant is consolidated into a hard permeable mass which filters out and prevents the migration of formation sands with fluids produced from the fracture into the wellbore.

When the unconsolidated producing formation or zone has a height of about 100 feet or less, a minimum of 5 to 10 feet of the formation must be consolidated, fractured and packed with consolidated proppant. Generally, the ratio of the total height of the producing formation or zone to the height of the consolidated and fractured portion of the formation or zone is about 10. When the producing zone height is greater than about 100 feet, multiple fractured consolidations can be utilized.

The consolidated portion of the producing formation or zone surrounding the wellbore formed in accordance with this invention is generally ring-shaped having a minimum vertical thickness of about 5 feet and a diameter in the range of from about 1 to about 8 feet. As mentioned, the bi-wing fracture formed extends from opposite sides of the wellbore through the ring-shaped consolidated portion and outwardly into the unconsolidated formation to an optimum distance based on the overall size of the producing formation or zone and other factors.

Thus, the present invention is well adapted to carry out the objects and attain the benefits and advantages mentioned as well as those which are inherent therein. While numerous changes to the apparatus and methods can be made by those skilled in the art, such changes are encompassed within the spirit of this invention as defined by the appended claims.

What is claimed is:

1. A method of stimulating fluid production from an unconsolidated formation penetrated by a wellbore while preventing the migration of formation sands with fluids produced from the formation, comprising the steps of:
    (a) injecting a hardenable resin composition into a portion of said formation surrounding said wellbore and causing said resin composition to harden whereby said portion of said formation is consolidated into a hard permeable mass;
    (b) forming at least one indentation in said wellbore which extends into said consolidated portion of said formation to thereby facilitate the initiation of a fracture;
    (c) creating a fracture in said formation extending from said wellbore through said consolidated portion of said formation into an unconsolidated portion of said formation; and
    (d) depositing hardenable resin composition coated proppant in said fracture and causing said resin composition to harden whereby said proppant is consolidated into a hard permeable mass which filters out and prevents the migration of formation sand with fluids produced through said fracture into said wellbore.

2. The method of claim 1 wherein said indentation formed in said weilbore is comprised of a hole formed by a perforating gun.

3. The method of claim 1 wherein said indentation formed in said wellbore is comprised of a slot formed by a fluid jet cutting tool.

4. The method of claim 1 wherein said hardenable resin composition is comprised of an organic resin selected from the group consisting of novolak resins, polyepoxide resins, polyester resins, phenol-aldehyde resins, urea-aldehyde resins, furan resins and urethane resins.

5. The method of claim 4 wherein said hardenable resin composition is caused to harden by being heated in said formation.

6. The method of claim 4 wherein said hardenable resin composition further comprises an internal hardening agent which causes said resin to harden after being injected or deposited in said formation.

7. The method of claim 4 which further comprises the step of contacting said hardenable resin composition with an external hardening agent after said hardenable resin composition has been injected or deposited in said formation thereby causing said resin composition to harden.

8. The method of claim 6 wherein said hardenable resin composition is a polyepoxide resin and said internal hardening agent is a liquid eutectic mixture of amines and methylene dianiline diluted with methyl alcohol.

9. The method of claim 7 wherein said hardenable resin composition is a furan resin and said external hardening agent is hydrochloric acid.

10. The method of claim 1 wherein said fracture is created in accordance with step (c) by pumping a fracturing fluid into said formation at a sufficient rate and pressure to fracture said formation.

11. The method of claim 10 wherein said hardenable resin composition coated proppant is suspended in said fracturing fluid and is deposited in said fracture in accordance with step (d) by said fracturing fluid.

12. A method of stimulating fluid production from an unconsolidated formation penetrated by a wellbore while preventing the migration of formation sands with fluids produced from the formation, comprising the steps of:
    (a) injecting a hardenable resin composition into a portion of said formation adjacent to and surrounding said wellbore and causing said resin composition to harden whereby said portion of said formation is consolidated into a hard permeable mass;
    (b) forming a pair of opposing indentations in said wellbore which extend into said consolidated portion of said formation to facilitate the initiation of a bi-wing fracture extending from said wellbore;
    (c) creating a bi-wing fracture in said formation extending from said wellbore through said consolidated portion of said formation into unconsolidated portions thereof; and
    (d) depositing hardenable resin composition coated proppant in said fracture and causing said resin composition to harden whereby said proppant is consolidated into a hard permeable mass which filters out and prevents the migration of formation sands with fluids produced through said fracture into said wellbore.

13. The method of claim 12 wherein said opposing indentations formed in said wellbore in accordance with step (b) are opposing holes formed by a perforating gun.

14. The method of claim 12 wherein said opposing indentations formed in accordance with step (b) are opposing slots formed by a fluid jet cutting tool.

15. The method of claim 12 wherein said hardenable resin composition is comprised of an organic resin selected from the group consisting of novolak resins, polyepoxide resins, polyester resins, phenol-aldehyde resins, urea-aldehyde resins, furan resins and urethane resins.

16. The method of claim 15 wherein said hardenable resin is caused to harden by being heated in said formation.

17. The method of claim 15 wherein said hardenable resin composition further comprises an internal hardening agent which causes said resin to harden after being injected or deposited in said formation.

18. The method of claim 15 wherein said hardenable resin composition is contacted with an external hardening agent after said hardenable resin composition has been injected or deposited in said formation thereby causing said resin composition to harden.

19. The method of claim 17 wherein said hardenable resin composition is a polyepoxide resin and said internal hardening agent is a liquid eutectic mixture of amines and methylene dianiline diluted with methyl alcohol.

20. The method of claim 18 wherein said hardenable resin composition is a furan resin and said external hardening agent is hydrochloric acid.

21. The method of claim 12 wherein said fracture is created in accordance with step (c) by pumping a fracturing fluid into said formation at a sufficient rate and pressure to fracture said formation.

22. The method of claim 12 wherein said hardenable resin composition coated proppant is suspended in said fracturing fluid and is deposited in said fractures in accordance with step (d) by said fracturing fluid.

* * * * *